Dec. 31, 1929.    L. E. STEWART    1,741,886
ART OF SHEET GLASS MANUFACTURE
Filed June 6, 1925    2 Sheets-Sheet 1
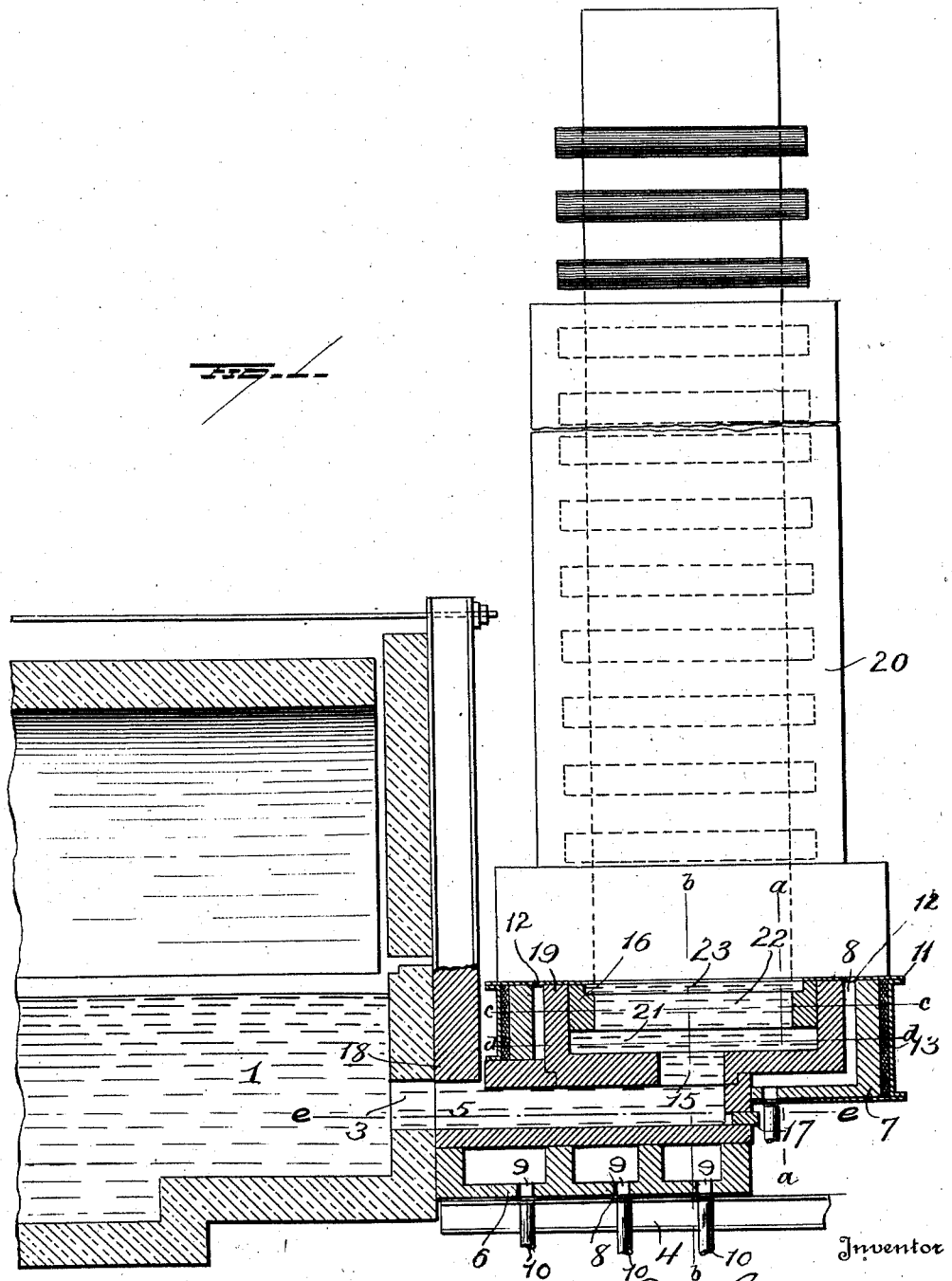
Inventor
L. E. Stewart
By Seymour & Bright
Attorneys Dec. 31, 1929.  L. E. STEWART  1,741,886
ART OF SHEET GLASS MANUFACTURE
Filed June 6, 1925   2 Sheets-Sheet 2
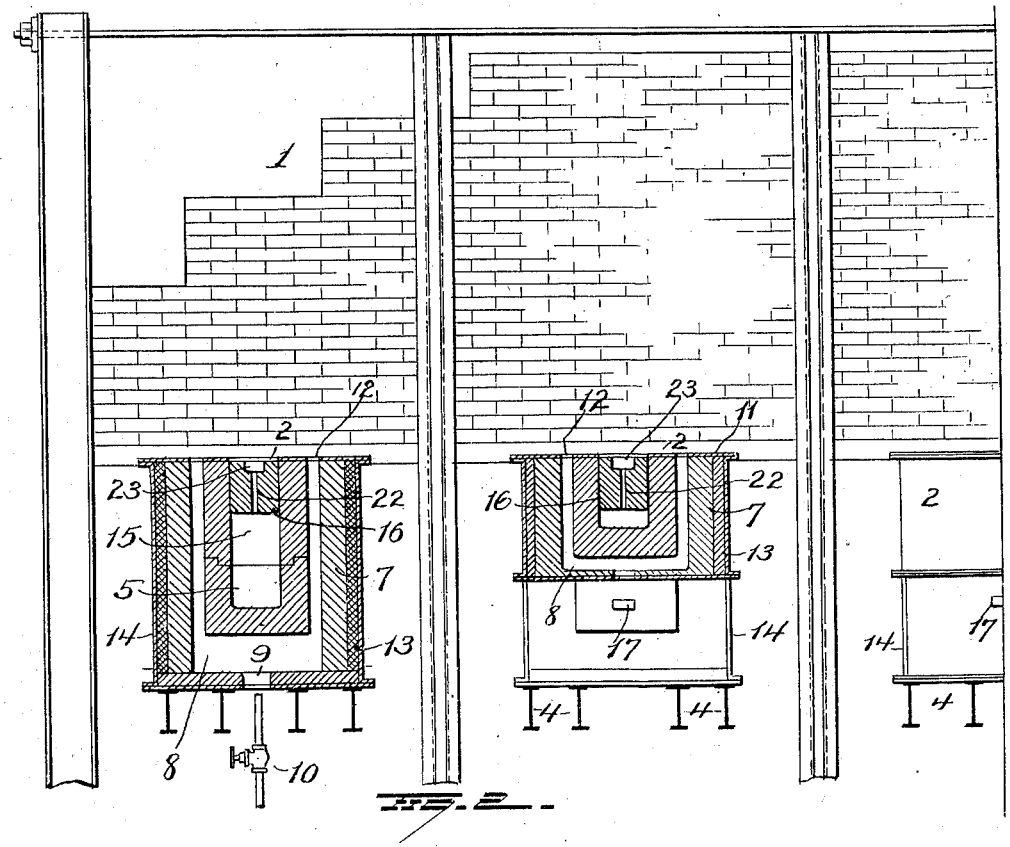
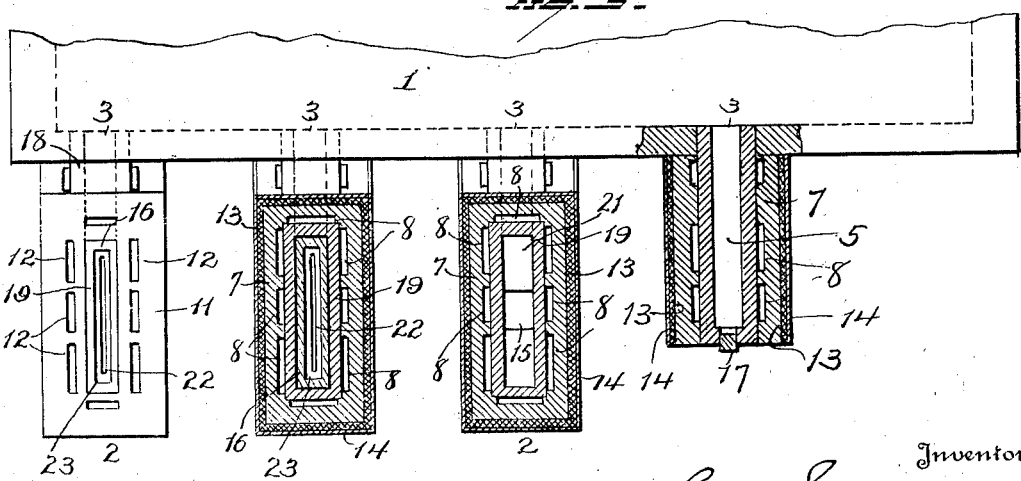
Inventor
L. E. Stewart
By Seymour & Bright
Attorneys Patented Dec. 31, 1929

1,741,886

UNITED STATES PATENT OFFICE

LAURENCE E. STEWART, OF BRADFORD, PENNSYLVANIA, ASSIGNOR TO ROLLAND GLASS COMPANY, OF CLARKSBURG, WEST VIRGINIA

ART OF SHEET-GLASS MANUFACTURE

Application filed June 6, 1925. Serial No. 35,412.

My invention relates to the art of sheet-glass manufacture and its primary object is to produce a better and more uniform quality of glass than has heretofore been obtainable at the same cost. It is well-known that after glass is properly melted, the less it is disturbed, either by mechanical agitation or by rapid cooling and reheating, during transfer from the melt to the point of draw, the better and more uniform is the quality of the product. Therefore, an object of my invention is to provide a structure whereby the glass may be withdrawn from the main tank at a point below the surface of the molten glass, and another object is to provide means whereby the molten glass may flow from the melting tank to the drawing point with minimum agitation and with temperature controlling means. These objects are attained in such an apparatus as is illustrated in the accompanying drawings in the manner hereinafter fully described, and the invention resides in certain novel features particularly pointed out in the appended claims.

In the drawings, Figure 1 is a vertical section of a portion of a melting tank and a drawing pot cooperating therewith, the section being taken in the medial longitudinal plane of the pot, a portion of a drawing and annealing machine being conventionally indicated;

Figure 2 is an end elevation of the tank with a plurality of drawing pots, the pots being shown in end elevation and in transverse vertical section on the lines a—a and b—b, Figure 1, respectively;

Figure 3 is a view partly in plan and partly in horizontal section, the planes of the sections being indicated by the lines c—c, d—d, and e—e, Figure 1, respectively.

The melting and refining tank 1, may be of any approved construction adapted for the continuous production of molten glass, a plurality of drawing pots 2 being arranged along the end of the tank and in direct communication with the respective outlet ports 3 of the tank. The pots are supported by beams 4 in such position that the conduit 5 in each pot is, in effect, an elongation of an outlet 3 of the tank and a leak-proof joint between the tank and the pot is provided, it being noted at this point that said conduit and port are below the normal level of the glass in the tank. Each pot includes a bottom 6 and walls 7 of brick or other refractory material so formed or arranged as to provide flues 8 around the conduit and the drawing stone to which heat is supplied through an opening 9 in the bottom 6 from any convenient source, a valve-controlled gas burner 10 being illustrated. The pot is covered by a top plate 11 having openings 12 therethrough which openings may be covered with bricks so that by closing some openings and uncovering others the heat may be held at any point or permitted to escape as may be desired, the temperature within the pot being thus easily controlled. A covering, 13, of heat-insulating material is placed around the walls 7, and a casing 14 of metal plates is bolted or otherwise secured around the entire pot so that it will be held together as a unitary structure.

The conduit 5 of the pot is defined by a hollow or tubular body resting on the bottom 6 of the outer structure and extending over the heat flues or channels therein. This body may be of any approved material, clay or porcelain being preferred, although some metal alloys are suitable. The conduit 5 has an opening 15 in its top wall adjacent its outer end through which the glass may pass to the drawing stone 16, and in the front end of the conduit is a plug 17 whereby the conduit may be tapped when necessary, it being noted here that the upper portion of the pot overhangs the outer front end of the conduit so that the passage 15 is disposed centrally of the chamber into which it opens. Movable vertically across the inner end of the conduit is a gate or stopper 18 by which the flow of glass may be cut off or regulated as desired, the stopper being raised and lowered by any form of lifting mechanism now in use. The inner body or wall of the pot defines a vertical extension 19 above the conduit in the upper end of which the draw stone 16 is mounted, the drawing and annealing machine, indicated conventionally at 20, being arranged to receive the glass directly from the drawstone. It will be noted that the drawstone floats on the body of glass within the extension 19 which defines a relatively narrow shallow elongated chamber 21 receiving the glass directly from the passage 15, and it will also be noted that the drawstone has a very restricted longitudinal slot 22 extending vertically therethrough, a channel 23 being formed in the top of the drawstone around the upper end of the slot so that the thin sheet of glass rising through the slot may expand sufficiently to form a body which will be effectually taken up by the bait or other engaging element of the drawing and annealing machine.

From the foregoing description, taken in connection with the accompanying drawings, it will be seen that I have provided a very simple construction whereby the flow of molten glass to the point of draw will produce the least possible disturbance of the glass and, as the flow will be through or over a heated path, the temperature of the glass will be maintained until it is taken from the drawstone by the operation of the drawing and annealing machine. The top of the drawstone is approximately in the plane of the level of the glass in the tank so that the glass will flow in a natural even manner to the point of draw. Moreover, as the glass leaves the tank at a point below the surface of the molten glass in the main tank, the finished article will be of a high uniform quality, as dirt and foreign matter are apt to accumulate on the surface, rather than below it, and fluctuations of temperature, due to weather conditions or shifting winds, will affect the surface more quickly than the body below the surface.

Changes may be made in the minor details of construction without departing from the scope of the invention as the same is defined in the following claims, and I, therefore, do not confine myself to the precise forms shown in the accompanying drawings which are illustrative only.

Having fully described my invention what I claim as new and desire to secure by Letters Patent, is:—

1. The combination with a glass-melting tank, of a drawing pot in juxtaposition to the tank and having an inner wall defining a passage leading from the tank to a point of draw, an outer wall housing the inner wall and having flues therein, means for supplying heat to the flues, a heat-insulating cover upon the exterior of the outer wall, and a casing binding the parts together.

2. The combination with a glass-melting tank, of a drawing pot external thereto and having an inner wall defining a passage leading from the tank to a point of draw, an outer wall housing the inner wall and having flues extending under and across the bottom of said passage and up the sides thereof, and means for supplying heat to the flues.

In testimony whereof, I have signed this specification.

LAURENCE E. STEWART.